Aug. 5, 1958    J. M. CUNNINGHAM    2,846,661
ELECTRICAL CONTROL SYSTEM FOR MAGNETIC-RECORDER
Filed Aug. 4, 1952    4 Sheets-Sheet 1

INVENTOR.
JAMES M. CUNNINGHAM
BY
Attorney

Aug. 5, 1958     J. M. CUNNINGHAM     2,846,661
ELECTRICAL CONTROL SYSTEM FOR MAGNETIC-RECORDER
Filed Aug. 4, 1952

INVENTOR.
JAMES M. CUNNINGHAM
BY
Attorney

Aug. 5, 1958  J. M. CUNNINGHAM  2,846,661
ELECTRICAL CONTROL SYSTEM FOR MAGNETIC-RECORDER
Filed Aug. 4, 1952  4 Sheets-Sheet 3

RECORDING CONTROL CIRCUIT

REPRODUCING CONTROL CIRCUIT

INVENTOR.
JAMES M. CUNNINGHAM
BY
Attorney

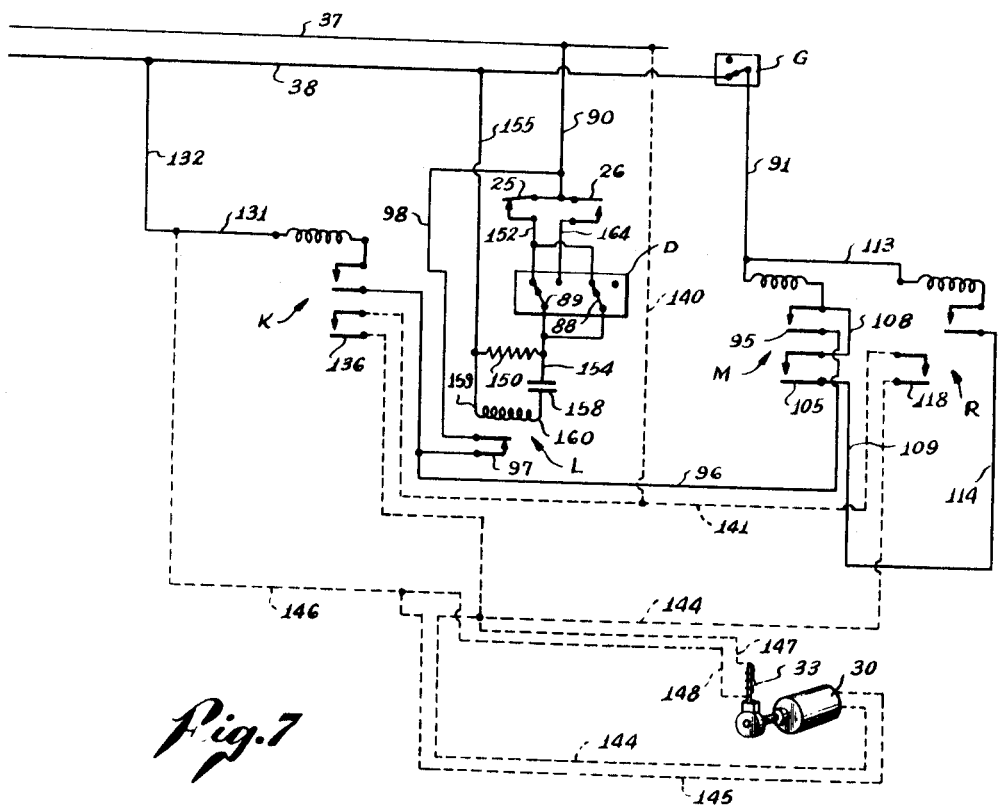

United States Patent Office 2,846,661
Patented Aug. 5, 1958

2,846,661

ELECTRICAL CONTROL SYSTEM FOR MAGNETIC-RECORDER

James M. Cunningham, Los Angeles, Calif., assignor to Techno Instrument Company, Los Angeles, Calif., a copartnership Application August 4, 1952, Serial No. 302,578

20 Claims. (Cl. 340—15)

This invention relates to electrical control systems and circuits for magnetic-recording devices as used to record and reproduce wave phenomena for various purposes, with special reference to the study of vibration in various structures and the study of shock waves and sonic waves as well as super sonic waves in various media including the air, earth and physical bodies.

While the basic concepts are applicable to a wide range of devices and purposes, the invention has been initially embodied in a control system for a multiple-channel magnetic-recorder specifically adapted for geophysical exploration procedures wherein seismic waves created by one or more expolsions are recorded at multiple points for subsequent study and analysis. This initial embodiment of the invention has been selected for the present disclosure as an example to guide those skilled in the art who may have occasion to apply the same principles for other specific purposes.

The particular magnetic-recorder for which the present specific control system is constructed is a 44-channel recorder described in detail in my co-pending application, Serial Number 292,104, filed June 6, 1952, which prior disclosure is hereby made a part of the present disclosure by reference.

The general object of the invention is to provide a time saving and foolproof control system or arrangement of inter-related control circuits to facilitate operation of this type of magnetic recorder. The need for such a control system not only arises from the fact that such a recorder is a complicated device with numerous components to be set and adjusted but also arises from the fact that in many situations it is highly important to provide positive and readily perceived assurance that the recording apparatus is ready for a recording operation before a test operation is carried out. In seismic exploration, for example, considerable time, effort and expense are involved in preparing for test explosions and it is unfortunate to detonate explosives after elaborate preparation only to have the recording apparatus fail to function because of some oversight or because some essential component is either inoperative or out of proper adjustment.

The possibilities for omission and error in the settings and adjustments required to ready such a multiple-channel device for recording operation may be readily appreciated when it is considered numerous circuits are required in such a recorder for numerous essential functions, including heating the filaments of the various amplifiers, supplying plate current to the various amplifiers, energizing a motor to move a recording medium relative to the plurality of magnetic heads, and controlling a magnetic brake to terminate a recording or reproducing operation. All of these components must be incorporated in a single compact device for use in the field. It is also to be noted that separate recording amplifier units and separate reproducing amplifier units are required for each of the numerous channels, and that all of the recording amplifiers should be checked before any important recording operation.

In the present magnetic recorder the recording medium is a relatively wide flexible sheet that is detachably mounted on the circumferential surface of a rotary drum and the drum has a first starting position for beginning either a recording operation or a reproducing operation and has a second loading position to facilitate the mounting of a record sheet for the beginning of an operation or the removal of a record sheet at the end of an operation. A recording operation may be prevented at a crucial moment by failure to place the rotary drum at the required starting position and by numerous other oversights including failure to heat the filaments of the recording amplifier, failure to provide plate current to the recording amplifiers, failure to adjust the plate current for each channel, and failure to provide current for the drum motor. A recording operation may also be defeated or at least badly handicapped by inadvertently overloading a portable electromotive source with the circuits of the numerous reproducing amplifier units in addition to the circuits of the recording amplifier units.

One of the important objects of the invention is to minimize such oversights and similar causes of inoperativeness. This object is attained in part by providing means to indicate when at least the essential components of the recorder are properly adjusted and set for a recording operation. It is a further object of the present practice of the invention to provide for control of the recorder as well as readiness indication at a point remote from the recording operation. Such remote control and remote indication are especially desirable in geophysical exploration.

The contemplated readiness indicator comprises what may be termed an arming circuit together with a sensible signal means such as a signal lamp or buzzer at the remote control station that is responsive to closing of the arming circuit. The arming circuit has a plurality of switches cooperative to close the circuit, at least some of which switches correspond to settings and adjustments required in components of the system in preparation for a recording operation. These switches close in response to the required adjustment and settings whereby current flow through the arming circuit to energize the sensible signal means provides assurance that the system is actually ready for a recording operation.

One of the special objects of the arming circuit arrangement is to make sure that the filaments in the recording amplifiers are heated to operative temperature before a recording operation is started. This object is attained by using a time-delay relay having normally open contacts in the arming circuit, the relay operating to close the contacts in response to closing of the filament circuit for the recording amplifiers. The relay responds with sufficient time delay to permit adequate heating of the filaments. Thus the arming signal indicates, among other things, that the recording amplifier filaments are at operative temperature. It is also contemplated that the control system of the recorder will prevent inadvertent recording operation before the arming circuit is completed. Prevention is accomplished by placing a normally open switch in the recording control circuit to close in response to closing of the arming circuit.

A further special object of the invention is to provide a motor control circuit for the drum or rotary record holder to stop the rotary holder automatically at either its starting position or its loading position as desired. In this regard a feature of the invention is an arrangement that not only provides for automatically stopping the rotary holder at a predetermined position but also enters into the function of the arming circuit to insure that the record holder will be at its starting position when a recording operation is initiated. In the present specific embodiment of the invention the drum or rotary record holder makes one complete revolution for either a recording cycle or a reproducing cycle and normally starts and stops at a given position, hereinafter termed the starting position.

A specific object of the invention is to meet a certain problem that arises from this fact that the rotary record holder normally starts and stops at the same position and the stop switch responsive to the positioning of the rotary record holder must be closed both at the start and at the end of an operating cycle. In effect, the drum actuating motor must be non-responsive to the initial closed state of the stop switch but responsive to the second closing of the switch at the end of the operating cycle. A feature of the invention is that this problem is solved by a special arrangement of a capacitor, a resistor and a stop relay, as will be explained. A further feature of the invention in this regard is the use of such a combination to terminate both a recording cycle and a reproducing cycle. Separate self-locking relays are used for controlling the recording and reproducing operations, respectively, and both of the relays having locking circuits which are opened automatically by the same stop switch. As will be explained, a further feature of the invention is an arrangement that permits the reproducing cycle to be repeated continuously as many times as may be desired and yet provides for stopping this repetitive cycling at the starting position of the record carrier.

A further object of the invention is to avoid wasteful consumption of electric current, especially since a geophysical exploration apparatus of this character for use in the field remote from power lines must often provide its own power. As will be apparent, various features of the invention relate to this object. For example, if a dynamotor is used to generate current, operation of the dynamotor is automatically restricted to the period of actual operation of the recorder for either recording or reproducing. Moreover, plate current cannot be supplied to either the recording amplifier units or the reproducing amplifier units unless the corresponding filament heating circuits are closed. Likewise the plate circuits of the recording amplifier units cannot be closed for the purpose of adjusting the amplifiers unless the corresponding filament circuits have been closed long enough to bring the filaments to operating temperature. The control system of the invention also prevents supply of plate current to both the recording amplifier units and the reproducing amplifier units at the same time.

A still further object of the invention is to provide a control system to correlate magnetic recording of seismic waves with the detonation of explosives to create the waves. This object is attained by combining a firing switch for the explosive with a starting switch for the recorder and preferably providing means which makes the firing circuit inoperative if the recording control circuit is inoperative.

The foregoing and other objects, advantages and features of the invention will be apparent in the following detailed description of the invention in conjunction with the accompanying drawings.

In the drawings which are to be regarded as merely illustrative,

Fig. 7 is a separate diagram of the motor control circuit incorporated in Fig. 1.

Physical structure of the magnetic recorder

Figure 1:
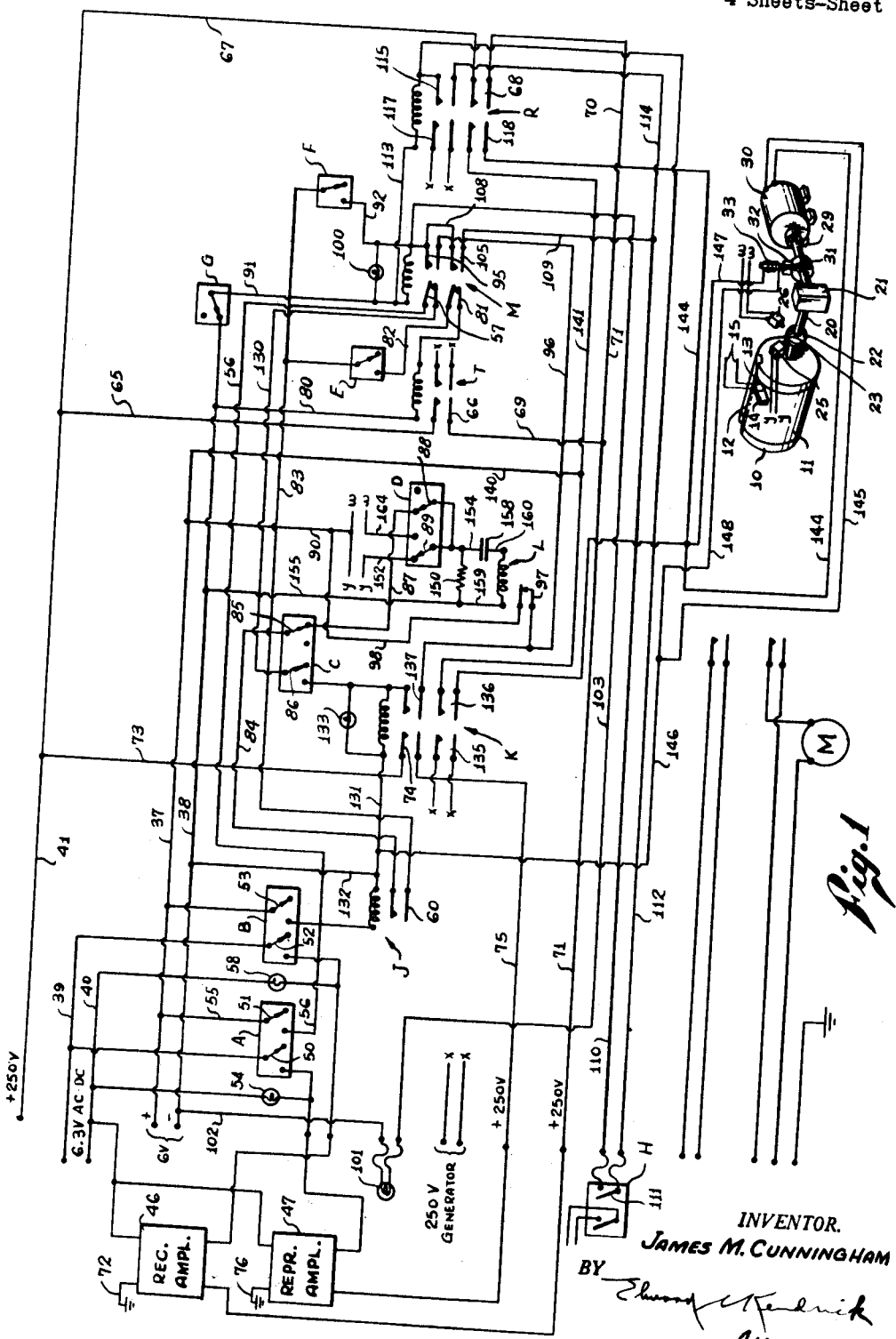
Fig. 1 is an over-all wiring diagram of the presently preferred embodiment of the control system, the diagram including a schematic representation of parts of the magnetic-recorder for which the control system of the invention is designed.

Fig. 1 shows certain essential parts of the multiple-channel magnetic recorder which is described in detail in the above-mentioned copending application. The apparatus includes a record holder in the form of a rotary drum 10 that carries a recording medium in the form of a sheet 11 that is wide enough for the desired number of record tracks, there being 44 concurrent tracks in this instance. The two ends of the record sheet 11 meet in a longitudinal peripheral groove 12 in the drum 10 where suitable means (not shown) is provided for releasably engaging the sheet ends to hold the sheet in tension against the circumferential surface of the drum.

There are 44 magnetic heads positioned in a row across the circumferential surface of the rotary drum 10 but for clarity of illustration Fig. 1 shows only one magnetic head 13 on a support means 14 with two wires 15 connected to the magnetic head in the usual manner. In Fig. 1 the rotary drum 10 is positioned with the groove 12 relatively close to the magnetic head 13 this being the starting position of the drum for either a recording operation or a reproducing operation. During such operation the drum will rotate clockwise. For the purpose of mounting a sheet 11 on the drum 10 to begin a recording or reproducing operation or for the purpose of removing a sheet at the end of such an operation, the drum 10 is stopped at a second position not shown in Fig. 1. At this second position the groove 12 is liberally spaced from the magnetic head 13 for free access to the ends of the sheet 11 and for convenient manipulation of the sheet-fastening means on the drum.

In the particular arrangement shown, the rotary drum 10 is mounted on a driven shaft 20 operated by gearing in a gear box 21 and the driven shaft carries a rotary cam 22 to operate suitable stop switches associated with the stop position and loading position, respectively, of the rotary drum. The rotary cam 22 has an operating lobe 23 which actuates a stop switch 25 of the pressure-responsive type at the starting position of the rotary drum 10 and actuates a second similar stop switch 26 at the loading position of the drum. These two switches 25 and 26 which may be conveniently termed the starting switch and loading switch, respectively, are connected in the wiring diagram as indicated in Fig. 1, the starting switch being connected at the points $y$, $y$ and the loading switch being connected at the points $w$, $w$.

For actuating the driven shaft 20, a drive shaft 29 extends from a motor 30 to the gear box 21 and for stopping the drum promptly, when desired, a suitable brake is provided, including a brake drum 31 on the drive shaft 29 and a cooperating brake shoe 32. Normally suitable spring means (not shown) urges the brake shoe 32 into effective pressure contact with the brake drum to immobilize the rotary drum 10 and a suitable solenoid 33 is adapted to retract the brake shoe 32 for free rotation of the record-holding drum 10 whenever the motor 30 is energized.

General arrangement of the electrical control system

The means for supplying current to the control system includes a pair of leads 37 and 38 from a suitable source of 6 volt direct current, a pair of leads 39 and 40 from a source of 6.3 volt A. C. or D. C. current for the amplifier filaments, and, finally, lead 41 to supply 250 volt direct current for the plate circuits of the various amplifier units. In some instances a dynamotor will be used to supply the plate current and in such instances the dynamotor (not shown) will be controlled by a circuit represented by two wires 42 and 43, which two wires are connected with the system at points designated "$x$" in Fig. 1.

In Fig. 1 a block 46 represents all of the 44 recording amplifier units and a second block 47 represents all of the 44 reproducing amplifier units. For convenience and simplicity the blocks will hereinafter be referred to as the recording amplifier and the reproducing amplifier, respectively.

The manually operable parts of the control system include: a filament switch designated A for the reproducing amplifier 47; a filament switch B for the recording amplifier 46; a reproducing control switch C shown in its off position in Fig. 1; a drum position selector switch D; a test switch E; an arming switch F; a reset switch G for breaking the arming circuit when desired; and a remote starting switch H for initiating a cycle of recording operation.

The control system is characterized by the use of a number of relays, which in this instance include: a filament relay J; a reproducing relay K; a stop relay L for stopping the rotary drum 10 at either of its two positions; an arming relay M; a recording relay R; and a test relay T.

Filament switch A has a main switch arm 50 and co-acting auxiliary switch arm 51 and in like manner filament switch B has a main switch arm 52 and a co-acting auxiliary switch arm 53. When the filament switch A is operated the main switch arm 50 closes a circuit to heat the filaments in the reproducing amplifier 47 and at the same time energizes a signal lamp 54 to indicate that the filament circuit is closed. The auxiliary switch arm 51 is connected to the 6 volt lead 37 by a wire 55 and in its closed position connects with a wire 56 which leads to a pair of contacts 57 of the arming relay M for a purpose to be explained hereafter.

The main switch arm 52 of the filament relay B closes a circuit to heat the filaments of the recording amplifier 46 and also energizes a signal lamp 58 to indicate the closing of the circuit. At the same time the co-acting auxiliary arm 53 connects the coil of the filament relay J with the two 6 volt leads 37 and 38. The filament relay J is a delay-action relay and has a pair of contacts 60 which are normally open but close after a suitable delay period, say 30 seconds, to permit the filaments in the recording amplifier to heat up.

The plate circuit of the recording amplifier 46 includes a wire 65 from the previously mentioned lead 41 to a pair of normally open contacts 66 of the test relay T and a parallel connection by a wire 67 to a pair of normally open contacts 68 of the recording relay R. These two pairs of contacts are connected by wires 69 and 70, respectively, with a wire 71 leading to one side of the recording amplifier 46 the other side of the amplifier being grounded as indicated at 72. Thus the recording amplifier plate circuit may be closed by either the test relay T or the recording relay R. The plate circuit of the reproducing amplifier 47 includes a wire 73 from the previously mentioned lead 41, a pair of normally open contacts 74 of the reproducing relay K, a wire 75 to one side of the reproducing amplifier 47 and a ground connection 76.

Test circuit

Figure 2:
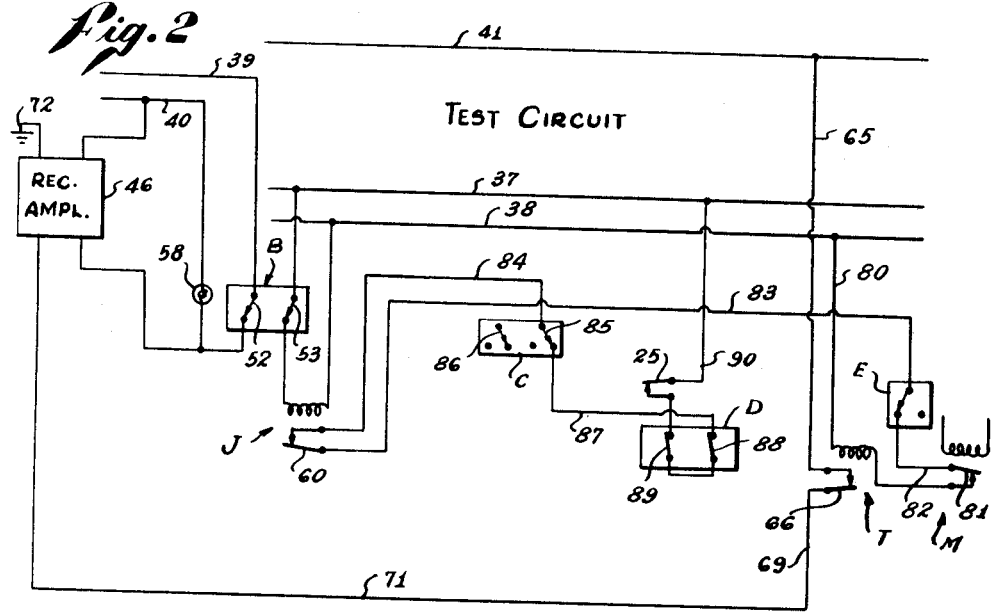
Fig. 2 is a separate wiring diagram of the test circuit incorporated in Fig. 1.

The function of the test circuit shown separately in Fig. 2 is to close the previously mentioned pair of contacts 66 in the test relay T thereby to interconnect the two wires 65 and 69 to close the previously described plate circuit for the recording amplifier 46. When this plate circuit is closed while the filaments of the recording amplifier 46 are heated it becomes possible to adjust the plate circuit of each recording amplifier unit, a suitable meter being provided for each unit to guide the operator.

It is contemplated that the test relay T will not operate in response to closing of the test switch E unless the filaments in the recording amplifier 46 are effectively heated and unless the reproducing switch C is in its off position to prevent simultaneous supply of plate current to the reproducing amplifier 47. It is also contemplated that the test relay T will not operate unless the rotary drum 10 is at its starting position since the test is usually made in preparation for a recording operation and the test should leave the rotary drum in position to start such an operation.

The test circuit in Fig. 3 may be traced as follows: lead 38 from the 6 volt D. C. source, wire 80, the coil of the test relay T, a pair of normally closed contacts 81 of the normally released arming relay M, wire 82, test switch E, wire 83, the pair of normally open contacts 60 of the filament relay J that are closed when the filaments of the recording amplifier 46 are heated, a wire 84, auxiliary arm 85 of the reproducing control switch C which is operatively connected to the main arm 86 to close a circuit when the main arm opens a circuit, wire 87, the two co-acting arms 89 and 90 of the drum position selector switch (the switch being in the starting position), the previously mentioned stop switch 25 that closes when the rotary drum 10 is in its starting position, and a wire 90 to the second lead 37 from the 6 volt D. C. source.

The pair of normally closed contacts 81 of the arming relay M will open to make the test circuit inoperative if the control system is armed or readied for a recording operation; the inclusion of the selector switch D makes it mandatory to set the switch properly; the inclusion of the drum-responsive stop switch 25 makes it impossible to carry out the test operation unless the rotary drum 10 is in its starting position; the switch arm 85 of the reproducing control switch C makes the test circuit inoperative to close the plate circuits of the recording amplifier 46 unless the reproducing switch C is in its off position to cut off the plate circuits of the reproducing amplifier 47; and the inclusion of the pair of contacts 60 of the filament relay J prevents closing of the test circuit unless the filaments of the recording amplifier 46 are heated to operative temperature. It will be noted that the auxiliary arm 53 of the recording filament switch B operates the filament relay J when the filament switch B is in its on position and that the on position of the filament switch B is indicated by energization of the signal lamp 58.

Arming circuit

Figure 3:
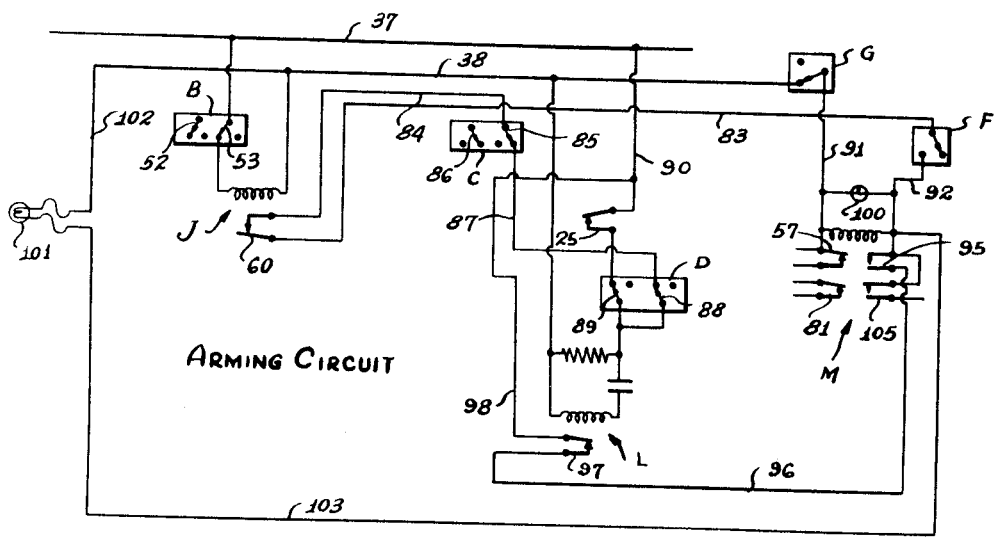
Fig. 3 is a separate diagram of the arming circuit incorporated in Fig. 1.

The purpose of the arming circuit of Fig. 3 in the present embodiment of the invention is to provide means both to insure and to indicate that the recorder is readied for a multiple-channel recording operation when explosives are detonated to create the seismic waves. It is contemplated that the arming circuit will serve to remind the operator at the recorder of any necessary adjustment or setting that he may inadvertently omit and it is further contemplated that the arming circuit will indicate to a second remote operator responsible for detonating the explosive that the recorder is properly readied to record the explosion effects.

The arming switch F is of a type that closes only momentarily when operated and such momentary closing means causes the arming relay M to be operated and locked if the recorder is actually readied for a recording operation. The arming circuit shown separately in Fig. 3 for energizing the coil of the arming relay M in response to momentary closing of the arming switch F may be traced as follows: lead 38 from the 6 volt D. C. source, reset switch G, wire 91, coil of arming relay M, wire 92, arming switch F, wire 83, normally open contacts 60 of filament relay J, wire 84, auxiliary arm 85 of the reproducing control switch C, wire 87, arms 88 and 89 of drum position selector switch D, drum responsive stop switch 25, and wire 90 to the second lead 37 from the 6 volt D. C. source.

The reset switch G is included in this circuit to provide means for breaking the circuit when desired. The inclusion of the normally open contacts 60 of filament relay J is to insure that the filaments of the recording amplifier units are heated; auxiliary arm 85 of the reproducing switch C insures that the plate circuits of the reproducing amplifiers are cut off; inclusion of the selector switch D insures that the rotary drum will rotate a complete revolution to return to its starting position; and drum responsive stop switch 25 insures that the rotary drum 10 is at its starting position.

With these various switches of the arming circuit closed, momentary energization of the coil of the arming relay M results in locking the arming relay in its operating position by means of the following locking circuit: lead 38 from the 6 volt D. C. source, reset switch G, wire 91, coil of the arming relay M, a pair of normally open locking contacts 95 of the arming relay, wire 96, a normally closed pair of contacts 97 of stop relay L, wire 98, and wire 90 to the second lead 37 from the 6 volt D. C. source.

An arming lamp 100 is connected across wires 91 and 92 in parallel with the coil of the arming relay M to indicate to the operator at the recorder when the arming circuit is closed. A second arming lamp 101 at the remote station of the second operator who is in charge of the explosion is energized at the same time by the following circuit: lead 38 from one side of the 6 volt D. C. source, wire 102, lamp 101, wire 103, a pair of normally open contacts 95 of the arming relay M, wire 96, the normally closed contacts 97 of the stop relay L, wire 98, and wire 90 to the second lead 37 from the 6 volt D. C. source.

It will be noted that energization of the arming relay M not only closes the pair of locking contacts 95 but also closes a pair of normally open contacts 105 and in addition opens the previously mentioned normally closed pair of contacts 57 and the previously mentioned normally closed pair of contacts 81. The normally open contacts 105 are in the recording control circuit as will be explained; the normally closed contacts 57 are associated with the reproducing amplifier 47; and the normally closed contacts 81 are in the testing circuit as heretofore explained.

*Recording control circuit*

It is contemplated that the control circuit for initiating and carrying out a recording operation will be operable only if the previously described arming circuit is closed. It is further contemplated that the remote starting switch H will be of a type to close only momentarily when operated and that when the recording control circuit is momentarily closed it will stay closed throughout a recording cycle or operation to be opened by the drum-responsive stop switch 25 when the drum 10 completes one revolution.

Figure 4:
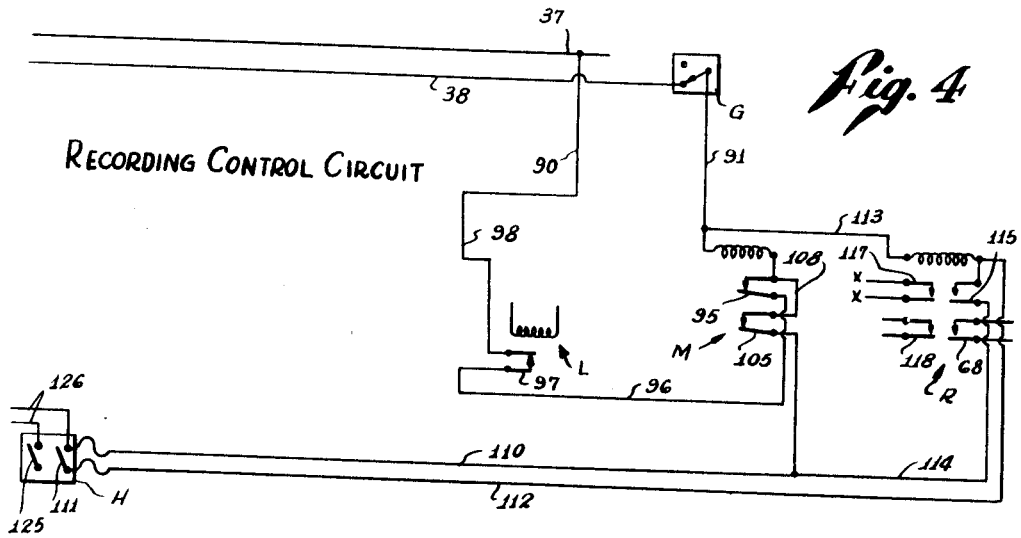
Fig. 4 is a separate diagram of the recording control circuit incorporated in Fig. 1.

In Fig. 4 the arming circuit has been closed to lock up the arming relay M. Under such conditions closing of the remote starting switch H will operate the recording relay R by means of the following circuit: lead 37 from one side of the 6 volt D. C. source, wire 90, wire 98, the normally closed pair of contacts 97 of the stop relay L, wire 96, the locking contacts 95 of the arming relay M, wire 108, the pair of contacts 105 of the arming relay, wire 109, wire 110, arm 111 of the starting switch H, wire 112, the coil of the recording relay R, wire 113, wire 91, the normally closed reset switch G, and the second lead 38 from the 6 volt D. C. source.

The starting switch H operates to close the circuit through the recording relay only momentarily but when the recording relay R is closed momentarily while the arming relay M is operated the recording relay locks itself in its operated position through the following locking circuit: wire 90, wire 98, the normally closed pair of contacts 97 of the stop relay L, wire 96, locking contacts 95 of the arming relay M, wire 108, contacts 105 of the arming relay, wire 109, wire 114, a pair of locking contacts 115 of the recording relay R, the coil of the recording relay R, wire 113, wire 91, reset switch G, and the second lead 38 from the 6 volt D. C. source.

In addition to the normally open pair of contacts 115, the recording relay has three additional pairs of normally open contacts 68, 117 and 118. Contacts 68 interconnect wires 67 and 70 (Fig. 1) to supply plate current to the recording amplifier 46, as heretofore explained. Contacts 117 close a circuit to operate a dynamotor if one is included in the apparatus for the supply of current. Contacts 118 close a circuit to energize the motor 30 and simultaneously to energize the solenoid 33 to retract the brake shoe 32 from the brake drum 31.

In the control system illustrated in Figs. 1 and 4, the starting switch H not only has the previously mentioned switch arm 111 for closing the recording control circuit but also has a second switch arm 125 to close a firing circuit through two wires 126 for detonating explosives. Thus operating the starting switch H both detonates explosives to create seismic waves and starts operation of the recorder for multiple recording of the seismic waves. The remote operator who is responsible for detonating the explosion does not, of course, close the starting switch H unless the remote arming lamp 101 is energized.

Figure 5:
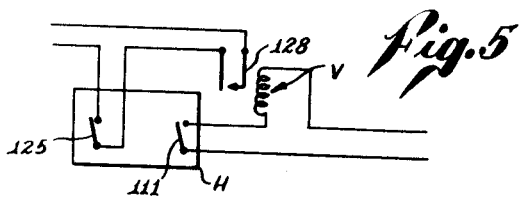
Fig. 5 is a diagram showing a modification of the recording control circuit.

To make sure that an inadvertent closing of the starting switch H while the arming relay M is released will not result in premature detonation of explosives, a relay V may be added as shown in Fig. 5. The coil of relay V is in series with the starting switch arm 111, as shown, and the pair of normally open contacts 128 of relay V are in series with the firing switch arm 125. If the arming relay M is released no current will flow through the coil of relay V when the starting switch arm 111 is closed. As a result, the normally open contacts 128 will remain open to prevent detonation of explosives when the firing switch arm 125 is closed.

When a recording operation is initiated by closing the circuit through the recording relay R, the rotary drum 10 completes one revolution and is then stopped by the stop switch 25. As will be described hereinafter, operation of the stop switch 25 causes the normally closed contacts 97 to open thereby to unlock and release both the arming relay M and the recording relay R. Release of these two relays causes de-energization of the motor 30 together with deenergization of the solenoid 33 to permit the spring operated brake shoe 32 to bring the rotary drum 10 to a prompt stop.

*Reproducing control circuit*

Figure 6:
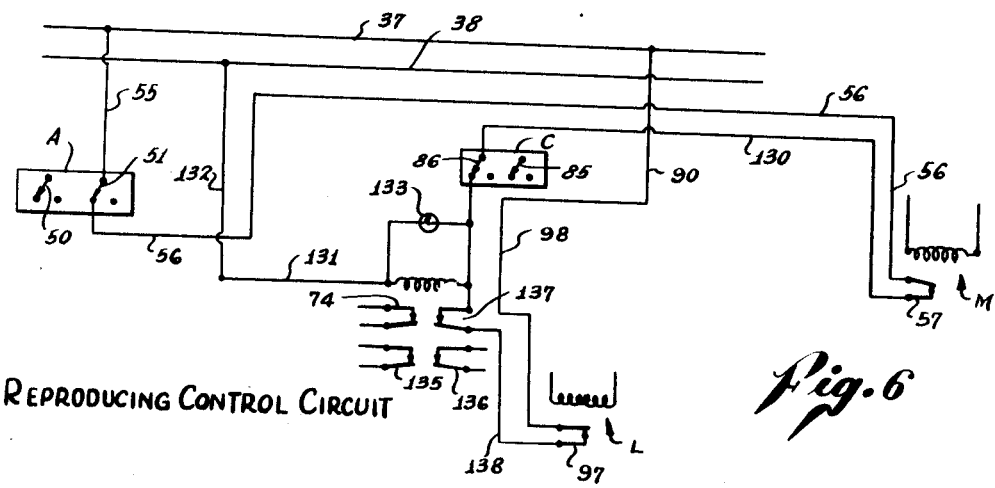
Fig. 6 is a separate diagram of the reproducing control circuit incorporated in Fig. 1.

The reproducing control circuit shown in Fig. 6 includes the auxiliary arm 51 of the switch A for the filament circuit of the reproducing amplifier 47 so that the reproducing control circuit is inoperative unless the filament heating circuit is closed.

If the reproducing control switch C is closed when the filament circuit A is closed the reproducing relay K is operated by the following circuit: lead 37 from the 6 volt D. C. source, wire 55, auxiliary arm 51 of the filament switch A, wire 56, the pair of normally closed contacts 57 of the normally released arming relay M, wire 130, the main arm 86 of the reproducing control switch C, the coil of reproducing relay K, wire 131, wire 132, and the second lead 38 from the 6 volt D. C. source. A suitable signal lamp 133 is in parallel with the reproducing relay K to indicate when the reproducing relay is operated.

When the reproducing relay K is operated it closes four pairs of normally open contacts incorporated in the relay construction. One pair of contacts 74 completes a circuit to supply plate current to the reproducing amplifier 47, as heretofore described. A second pair of contacts 135 closes a circuit to operate a dynamotor if such a source of current is included in the apparatus. The third pair of contacts 136 operates the motor 30 and the brake solenoid 33 to cause rotation of the rotary drum 10. The fourth pair of contacts 137 serves to close the following locking circuit to keep the coil of the reproducing relay K energized independently of the reproducing control switch C: lead 37 from the 6 volt D. C. source, wire 90, wire 98, a pair of normally closed contacts 97 of the stop relay L, wire 138, locking contacts 137, the coil of the reproducing relay K, wire 131, wire 132 and the second lead 38 from the 6 volt D. C. source.

The reproducing control switch C may be placed in either of its two positions. As long as it is in its on or operating position shown in Fig. 6, the rotary drum 10 will rotate continuously to continually repeat a cycle of reproducing signals recorded on the record sheet 11. If under such circumstances the reproducing control switch is opened the reproducing relay K will be continued to be operated by the above-described locking circuit but the locking circuit would be broken by momentary opening of the contacts 97 of the stop relay L when the rotary drum 10 reaches its starting position, as will be explained. The inclusion of the pair of contacts 57 in the reproducing control circuit insures that reproducing operation will not be initiated when the arming circuit is closed.

*Motor control circuit*

In the diagram Fig. 7 the circuit that actually energizes the motor and the brake solenoid is shown in dotted lines and the control circuit for controlling the starting and stopping of the motor is shown in solid lines.

When the recording relay R is operated the following circuit energizes the motor 30: wire 37 from one side of the 6 volt D. C. source, wire 140, wire 141, the pair of contacts 118 of the recording relay R, wire 144, motor 30, wire 145, wire 146, wire 131, wire 132, and the second lead 38 from the 6 volt D. C. source. Wires 147 and 148 are connected to wires 144 and 146, respectively, to place the brake solenoid 33 in parallel with the motor 30 for simultaneous energization of the motor and the solenoid. The pair of contacts 136 of the reproducing relay K are connected to wires 140 and 144, respectively, thereby placing the contacts 136 of the reproducing relay in parallel with the contacts 118 of the recording relay R so that the motor and brake solenoid may be energized by the reproducing relay K independently of the recording relay R.

It will be noted in Fig. 7 that the pair of contacts 97 of the stop relay L is in series with the locking circuits of the reproducing relay K, the arming relay M, and the recording relay R. It is also to be noted that the locking circuit of the arming relay M is in series with the locking circuit of the recording relay R. Thus momentary energization of the stop relay L to open the normally closed pair of contacts 97 will release the reproducing relay K to terminate a reproducing operation or will release the arming relay M and the recording relay R to terminate a recording operation.

The motor control circuit of Fig. 7 includes an auxiliary control circuit which may be termed a motor stopping circuit having the function of momentarily energizing the stop relay L to stop the motor 30. The motor will stop with the rotary drum 10 at either its starting position or its loading position in accord with the setting of the drum position selector switch D. This auxiliary motor stopping circuit includes the drum responsive stop switch 25 that closes when the rotary drum 10 is at the starting position and also includes the drum-responsive switch 26 that closes when the rotary drum 10 is at the loading position. For clarity these two switches 25 and 26 are shown diagrammatically in Fig. 7 as closely adjacent the drum positioning switch D.

When the drum-responsive switch 25 is initially closed it completes the following circuit through a resistor 150: wire 37 from one side of the 6 volt D.-C. source wire 90, switch 25, wire 152, arm 89 of the drum positioning switch D, wire 154, resistor 150, wire 155, and the second lead 38 from the 6 volt D.-C. source. The resulting initial establishment of a potential drop across the resistor 150 causes relatively high amperage current to flow through the following circuit to charge a capacitor 158, wire 154 on one side of the resistor 50 connected to one side of the capacitor 158, wire 159 on the other side of the resistor, the coil of the stop relay L, and wire 160 from the coil to the second side of the capacitor 158.

Subsequent opening of the described stop circuit to remove the potential drop across the resistor 150 causes the capacitor 158 to discharge but the resulting current flow through the coil of the stop relay L is of relatively low amperage because the current must flow through the resistor 150. The stop relay L is so adjusted that the normally closed pair of contacts 97 that are incorporated in the relay open in response to the relatively high amperage capacitor-charging current but do not open in response to the lower amperage capacitor-discharging current. Thus the normally closed relay contacts 97 open momentarily, preferably for a time interval of approximately ½ second in response to closing of the drum responsive switch 25 but do not respond to subsequent opening of the switch 25.

With the rotary drum 10 at its starting position, closing either the pair of contacts 118 of the recording relay R or the pair of contacts 136 of the reproducing relay K will start the motor 30. The consequent movement of the rotary drum 10 out of its starting position causes opening of the drum-responsive stop switch 25, but the stop relay L does not respond until the rotary drum 10 completes one revolution and again returns to its starting position to again close the switch 25. The closing of the switch 25 momentarily opens the pair of contacts 97 to unlock either recording relay R or the reproducing relay K, whichever one happens to be operated at the time.

To cause the rotary drum 10 to rotate from its starting to its loading position the operator first adjusts the system for reproducing operation and shifts the drum position selector switch from its normal starting position shown in Fig. 1 to its alternate loading position. Then the operator actuates the reproducing control switch C to swing the main arm 86 thereof momentarily out of its open position shown in Fig. 1 to its alternate closed position in Fig. 6. This momentary closing of the reproducing control switch C operates and locks the reproducing relay K as heretofore explained with reference to the reproducing control circuit shown in Fig. 6.

Since the operator closes the reproducing control switch C only momentarily and then restores it to its normal open position, the stop relay L will unlock the reproducing relay K in response to arrival of the rotary drum at its loading position and will thereby stop the motor. The stopping of the motor when the rotary drum reaches its loading position results from the fact that the arrival at the loading position closes the following circuit through the resistor 150 to cause momentary operation of the stop relay L: lead 37 from one side of the 6 volt D.-C. source, wire 90, the drum-responsive stop switch 26, wire 164, switch arm 89 of the selector switch D, wire 154, resistor 150, wire 155, and the second wire 38 from the 6 volt D.-C. source. In this circuit the coil 160 of the stop relay in parallel with the resistor 150 is energized for approximately half a second by the initial current flow and consequently opens the pair of contacts 97 momentarily. The momentary opening of the two contacts 97 brings the drum to a stop by opening the following circuit to unlock the reproducing relay K: wire 90 from lead 37, wire 98, the pair of contacts 97, wire 138, the coil of reproducing relay K, wire 131, and wire 132 to lead 38. To return the rotary drum 10 to its normal starting position the selector switch D is shifted back to its normal position shown in Fig. 7 and again the reproducing control circuit is closed momentarily to cause locking of the reproducing relay K, the relay being automatically unlocked by closing of the drum-responsive stop switch 25 in response to arrival of the rotary drum at its starting position.

Summary of operation

To install a new recording sheet, the operator turns on the filament switch A for the reproducing amplifier and turns the drum selector switch D from its normal starting position in Fig. 1 to its alternate loading position. The operator then manipulates the reproducing control switch C momentarily, turning the switch from the off position shown in Fig. 1 to the on position shown in Fig. 2 and back again. The result, as heretofore described, is that the drum rotates and stops at its load position. After the new recording sheet is installed on the drum, the operator returns the drum selector switch D to its normal starting position shown in Fig. 1 and again momentarily operates the reproducing control switch C. The drum now rotates again and stops automatically at its normal starting position.

At this point, the operator may decide to check and, if necessary, adjust each of the plate circuits of the individual recording amplifier units. To do so, he turns on the filament switch B of the recording amplifier, waits thirty seconds for the filaments to warm up, and then turns the test switch E from its normal open position of Fig. 1 to its closed position of Fig. 3, thereby closing the test circuit shown in Fig. 3. As heretofore explained, the test circuit will not operate unless the following conditions prevail: the drum selector switch D is set for starting a recording operation; the rotary drum is at its starting position; the reproducing control switch C is in its off position of Fig. 1; and the filament circuit of the recording amplifier is closed with the filaments warmed up.

To prepare for a recording operation without first making a test, the operator turns on the filament switch B of the recording amplifier and waits thirty seconds for the filaments to warm up. The operator then actuates the arming switch F which, as heretofore stated, operates to close only momentarily. If the arming lamp 100 that is controlled by the arming circuit of Fig. 3, does not light up, the system is not ready for a recording operation and must be checked. If the operator fails to turn on the filament switch B, for example, if he inadvertently turns on the filament switch A instead, the arming light will not turn on because the pair of contacts 60 of the filament relay J will remain open in the arming circuit. The contacts 60 will also remain open if the operator does not allow the full thirty seconds required for the filaments of the recording amplifier to warm up. If the reproducing control switch C is in its closed position of Fig. 3 instead of its open or off position of Fig. 1, or if the drum position selector switch D is not in its normal starting position shown in Fig. 1, or if the rotary drum is not at its starting position to close the drum-responsive stop switch 25, the arming lamp will not turn on.

When the arming circuit successfully closes as indicated by energization of the arming lamp 100, together with the remote arming lamp 101, the resultant momentary energization of the coil of the arming relay M causes locking of the arming relay in its operating position, as heretofore explained, and the system is now under control of the remote switch H. If the operator decides at this point to test and adjust the plate circuits of the recording amplifier units, he may open the reset switch G to remove the system from remote control and, of course, the arming lamps 100 and 101 will turn off.

When the arming lamp 100 goes on, the operator at the apparatus knows the system is ready for a recording operation and the remote arming lamp 101 also informs the remote operator at the remote firing station that the system is now ready so that he can proceed to actuate the remote starting switch H for closing the recording switch and detonating the explosive charges.

The remote starting switch H operates to close the circuit through the recording relay R only momentarily, but the recording relay locks itself in operating position by closing of its pair of locking contacts 115, as heretofore explained. A second pair of contacts of the recording relay R closes the plate circuit of the recording amplifier; a third pair closes a circuit to operate a dynamotor; the fourth pair closes the circuit to energize the drum motor and the brake solenoid.

When the drum completes the revolution that makes up a recording cycle, the drum automatically opens the stop switch 25 to cause the normally closed contacts 97 to open thereby to unlock and release both the arming relay M and the recording relay R. Release of these two relays causes de-energization of the drum motor, together with de-energization of the brake solenoid to permit the spring-operated brake shoe to bring the drum to a prompt stop.

To carry out a reproduction cycle after a recording cycle, the operator turns on the filament switch A of the reproducing amplifier, waits thirty seconds for the filaments to warm up, and then closes the reproducing control switch C to complete the reproducing control circuit of Fig. 6. As may be seen in Fig. 6, the reproducing control circuit will remain open and ineffective if the arming relay M is energized to open the pair of contacts 57. Thus the reproducing control circuit can never interfere with a recording operation.

Successful closing of the reproducing control circuit as signalized by the lamp 133 results in energization of the reproducing relay K and the closing of the four pairs of contacts of that relay. As heretofore explained, one pair of the contacts of the reproducing relay closes a circuit to supply plate current to the reproducing amplifier; a second pair of contacts closes a circuit to operate a dynamotor; a third pair of contacts energizes the drum motor and the brake solenoid; and a fourth pair of contacts closes a locking circuit to keep the reproducing relay K energized independently of the reproducing control switch C. Thus if the reproducing control switch C is turned to its off or open position, the reproducing operation will continue through one full rotation of the drum and then will stop automatically. On the other hand, if the reproducing control switch C is in its on or closed position, the reproducing cycle will be repeated continually until the switch is turned off.

It will be apparent to those skilled in the art that various changes, substitutions and other departures from the specifically described embodiment of the invention may be made within the spirit and scope of the appended claims.

Having described my invention, I claim:

1. In a magnetic-recorder of the character described having a rotary carrier for a recording medium, magnetic means for making a record track on said medium and motor means to actuate said carrier the combination therewith of a control system including: a first normally open stop switch adapted to close in response to movement of said carrier to a starting position relative to said magnetic means for starting a recording operation; a second normally open stop switch adapted to close in response movement of said carrier to a second loading position to permit mounting a recording medium on the carrier; a selector switch having a starting position representing the starting position of said carrier and a loading position representing the loading position of the carrier; circuit means having one side, connected to one side of both said first and second stop switches and having its other side connected to one side of said selector switch to form a control circuit, said selector switch at its starting position making connection with the other side of said first stop switch to close the control circuit therethrough and at its loading position making connection with the other side of said second stop switch to close the control circuit therethrough; a normally closed switch adapted to open only momentarily in response to initial current flow in said control circuit; a motor circuit to actuate said motor; means to close said motor circuit to start rotation of said carrier; and means to open said motor circuit in response to momentary opening of said normally closed switch thereby to stop said carrier automatically at its starting or loading position in accord with the position of said selector switch.

2. In a magnetic-recorder of the character described, the combination of: a rotary carrier for a recording medium; magnetic means for making a record track on said medium; motor means to actuate said carrier; a first normally open stop switch adapted to close in response to movement of said carrier to a first position relative to said magnetic means for starting a recording operation; a second normally open stop switch adapted to close in response movement of said carrier to a second loading position for mounting a recording medium on the carrier; a selector switch having a starting position representing the starting position of said carrier and a loading position representing the loading position of the carrier; circuit means having one side; connected to one side of both said first and second stop switches and having the other side connected to one side of said selector switch to form a control circuit, said selector switch at its starting position making connection with the other side of said first stop switch to close the control circuit therethrough and at its loading position making connection with the other side of said second stop switch to close the control circuit therethrough; a capacitor and a relay in series in said control circuit whereby closing said control circuit causes an initial momentary flow of current at relatively high amperage through said relay to charge said capacitor; a resistor in said circuit shunting said capacitor and relay whereby current at lesser amperage flows through said relay and resistor to discharge said capacitor when said control circuit is subsequently opened; a circuit to cause energization of said motor for actuation of said carrier; a starting switch to close said last mentioned circuit; a self-locking relay in said last mentioned circuit to hold the circuit closed independently of said starting switch; and a normally closed switch in the locking circuit of said self-locking relay, said normally closed switch being controlled by said first mentioned relay, said normally closed switch being adapted to open in response to said high amperage current flow and being non-responsive to said lesser amperage current flow whereby said normally closed switch unlocks said self-locking relay to stop said carrier at its first or second position in accord with the position with said selector switch.

3. A combination as set forth in claim 1 which includes: an arming circuit including said first normally open stop switch; and sensible signal means responsive to current flow through said arming circuit whereby energization of said signal means indicates that said rotary carrier is in said starting position.

4. A combination as set forth in claim 3 which includes: a recording amplifier; and a third normally open switch in said arming circuit in series with said first normally open stop switch, said third switch being responsive to said amplfier to close when the amplifier is adjusted for recording operation whereby energization of said signal means also indicates that the amplifier is ready for operation.

5. A combination as set forth in claim 4 in which said third normally open switch is a time-delay relay controlled by the filament circuit of said amplifier and is adapted to close after a time delay when the filament circuit is closed thereby to provide a time interval for heating of the amplifier filament before closing said arming circuit.

6. In a magnetic-recorder of the character described having a rotary carrier for a recording medium, magnetic means for making a record track on said medium, and motor means to actuate said carrier, the combination therewith of a control circuit including: a first normally open stop switch adapted to close in response to movement of said carrier to a starting position relative to said magnetic means for starting a recording operation; a second normally open stop switch adapted to close in response movement of said carrier to a loading position to permit mounting a recording medium on the carrier; a selector switch having a starting position representing the starting position of said carrier and a loading position representing the loading position of the carrier; circuit means having one side connected to one side of both said first and second stop switches and having the other side connected to one side of said selector switch to form a control circuit, said selector switch at its starting position making connection with the other side of said first stop switch to close the control circuit therethrough and at its loading position making connection with the other side of said second stop switch to close the control circuit therethrough; a recording control circuit to cause recording operation of the recorder; a relay in said recording control circuit having locking contacts to hold the circuit closed for recording operation; a reproducing control circuit to cause reproducing operation of the recorder; a relay in said reproducing control circuit having locking contacts to hold the reproducing control circuit closed for reproducing operation; and a normally closed switch in series with each of said locking contacts to terminate either a recording operation or a reproducing operation, said normally closed switch being adapted to open momentarily in response to initial current flow in said control circuit.

7. A system as set forth in claim 6 in which said first mentioned control circuit includes a capacitor, a resistor and an electromagnet for opening said normally closed switch magnetically, said capacitor and electromagnet being in series whereby closing of said first mentioned control circuit causes an initial momentary flow of current at relatively high amperage through the electromagnet to charge said capacitor, said resistor shunting said capacitor and electromagnet whereby current at lesser amperage flows through said electromagnet and resistor to discharge said capacitor when said control circuit is subsequently opened, said normally closed switch being responsive only to the relatively high amperage current flow through the electromagnet whereby the normally closed switch unlocks said relays when said rotary carrier reaches either its starting position or its loading position in accord with the position of said selector switch.

8. In a signal storing system adapted for geophysical exploration procedures wherein seismic waves created by one or more explosions are recorded for subsequent study and analysis through reproduction, a control device permitting the separate operation of the system for either recording or reproducing, but substantially preventing the inadvertent recording operation when reproducing is intended, or an inadvertent reproducing operation when recording is intended, said control device comprising: first means for arming the signal storing system when certain prespecified conditions are fulfilled, as are required for proper recording; a reproducing control circuit to control the reproducing operation of said signal storing system; a first switching device coupled to said arming circuit and connected in actuating current series with said reproducing control circuit so as to prevent the operation thereof when said arming circuit is on; and a second switching circuit in said reproducing control circuit positioned in the signal actuating path for said arming circuit to prevent the arming thereof when said reproducing control circuit has been actuated.

9. In a signal recording and reproducing system adapted for geophysical exploration procedures for recording seismic waves resulting from one or more explosions, and for reproducing signals representing such recordings, an electrical control system for ensuring that a recording operation is not performed until a recording medium therein is properly positioned, and power is available for the recording operation, and for preventing the inadvertent operation of recording or reproducing when the other is intended, said control system comprising: an arming circuit for indicating that said system is in a condition ready for recording, said arming circuit including a plurality of switches settable to indicate that said system is positioned at the desired recording starting point and that power is available for recording; a recording control circuit including a switching device actuable to provide an operating signal for said recording circuit in response to current flow in said arming circuit, whereby recording cannot be performed in said system until the system is ready for a recording operation; a reproducing control circuit including at least one switch adapted to be deactuated in response to current flow in said arming circuit to prevent reproducing when the system is armed for recording.

10. The control system defined in claim 9 wherein said arming circuit further includes a holding current path to prevent disarming until said system completes a recording cycle, said holding path including at least one switch to disarm said system at the completion of a recording cycle.

11. An interlocking control arrangement for a magnetic recorder including separate recording and reproducing amplifiers, the control arrangement preventing the simultaneous operation of said amplifiers as well as the inadvertent selective operation of one of said amplifiers when the intention is to operate the other of said amplifiers, said control arrangement comprising: an arming circuit including a first switch momentarily actuable to indicate that arming for recording is desired, including a second switch indicating that reproducing is not to be performed, and including a plurality of other switches indicating the other recording conditions are satisfied including the proper positioning of the recorder and the recording power is available; a reproduce switch arranged to be operable with said second switch; a recording control circuit including a current series path through said reproduce switch and a recording control circuit including a fourth switch actuable in response to the operation of said arming circuit and a fifth switch selectively actuable when the recording operation is desired, said recording control circuit being operable only when all of said plurality of switches are actuated in said arming circuit and said arming circuit is armed, and when said fifth switch is then subsequently actuated, and said reproducing circuit being operable only when said arming circuit is not armed and said reproducing switch is in the reproducing state.

12. In a recorder system for recording signals representing seismic waves caused by one or more explosions, the recorder system including means for rotating a record for a recording operation; a control system for ensuring that the record will not be rotated for a recording operation until it is at the desired starting position, until operating power for recording is provided, and until the operator desires to record and does, in fact, signal for a recording to begin, said control system comprising: an arming relay; an arming circuit to energize said arming relay, said arming circuit including at least one switch for each of the arming conditions including ensuring the proper starting position and presence of recording power; an arming switch in said arming circuit adapted to be momentarily actuated to close said circuit; a locking circuit to keep said arming relay energized after momentary operation of said arming switch, provided that said switches have been actuated to indicate the corresponding conditions; a recording relay; a recording control circuit for energizing said recording relay, including at least one switching element actuable in response to the energization of said arming relay to prevent energization of said recording relay prior to the energization of said arming relay; and a starting switch in said recording control circuit adapted for momentarily closing after said arming circuit has been energized, for energizing said recording control circuit, whereby a recording operation may only be performed after all of the necessary arming conditions for recording have been satisfied, and after signalling the start of recording through said starting switch.

13. In a system for recording signals representing seismic waves caused by one or more explosions, the system including means for rotating a record for a recording operation; a protective device for ensuring that the system has been properly prepared for a recording operation when an explosion is caused resulting in the seismic wave, said protective device comprising: first means for providing a sensible signal when all of the necessary pre-recording conditions have been satisfied except for the rotation of the record, said first means including an arming circuit adapted to be actuated to an on state when the record is positioned at the desired starting point and operating power is available for recording, and further including means for providing a remote indication of the on state of the arming circuit; and second means actuable only after said first means have been operated and said arming circuit is on, said second means including a starting switch and a second switch actuable in response to the energization of said arming circuit, said second means being adapted to provide driving power for rotating said record.

14. In a seismic recorder including a rotatable drum to retain a magnetic record therearound, and on electric motor to rotate the drum, a control circuit for the motor, said control circuit comprising: a position switch actuable only when the drum is in a predetermined position; an arming relay having a winding and a pair of self-locking contacts, said arming relay being actuable only upon the simultaneous occurrence of a plurality of conditions; a stop relay having a winding; a series circuit including a capacitor and said stop relay winding connected in series; a resistor connected in parallel with series circuit; said stop relay having a pair of normally closed contacts serially connected with said arming relay winding; said stop relay being actuable momentarily in response to actuation of said position switch by movement of the drum to said predetermined position; and a motor control relay having a pair of normally open contacts to energize said motor and a pair of self-locking contacts; a start switch connected in parallel with said motor control relay self-locking contacts; said arming relay having a pair of normally open contacts connected serially with said motor control relay winding.

15. In a seismic recorder including a rotatable drum to retain a magnetic record therearound, and an electric motor to rotate the drum, a control circuit for the motor, said control circuit comprising: a start position switch actuable only when the drum is in a corresponding start position; a load position switch connected in parallel with said start position switch and actuable only when the drum is in a corresponding load position; a motor control relay having a pair of self-locking contacts and a pair of normally open contacts to energize the motor; a selector switch having start and load positions, said selector switch being connected to one side of each of said position switches to cause deenergization of said motor control relay only upon actuation of said starting switch when in said start position and to de-energize said motor control relay only upon actuation of said load position switch when in said load position; an arming relay having a winding and a pair of self-locking contacts, said arming relay being actuable only upon the simultaneous occurrence of a plurality of conditions; a stop relay having a winding; a series circuit including a capacitor and said stop relay winding connected in series; a resistor connected in parallel with series circuit; said stop relay having a pair of normally closed contacts serially connected with said arming relay winding; said stop relay being actuable momentarily in response to actuation of said position switch by movement of the drum to said predetermined position; and a motor control relay having a pair of normally open contacts to energize said motor and a pair of self-locking contacts; a start switch connected in parallel with said motor control relay self-locking contacts; said arming relay having a pair of normally open contacts connected serially with said motor control relay winding.

16. In a seismic recorder including a rotatable drum to retain a magnetic record therearound, and an electric motor to rotate the drum, a control circuit for the motor, said control circuit comprising: a position switch actuable only when the drum is in a predetermined position; an arming relay having a winding and a pair of self-locking contacts, said arming relay being actuable only upon the simultaneous occurrence of a plurality of conditions; a stop relay having a winding; a series circuit including a capacitor and said stop relay winding connected in series; and a resistor connected in parallel with said series circuit; said stop relay having a pair of normally closed contacts serially connected with said arming relay winding; said stop relay being actuable momentarily in response to actuation of said position switch by movement of the drum to said predetermined position.

17. In a seismic recorder including a rotatable drum to retain a magnetic record therearound, and an electric motor to rotate the drum, a control circuit for the motor, said control circuit comprising: a position switch actuable only when said drum is in a corresponding and predetermined position; an arming relay having a winding and a pair of self-locking contacts, said arming relay being actuable upon the simultaneous occurrence of a plurality of conditions; a normally closed switch serially connected with said arming relay winding; and means to open said normally closed switch only momentarily and for a length of time independent of movement of the drum in response to actuation of said position switch by movement of the drum to said predetermined position.

18. In a seismic recorder including a rotatable drum to retain a magnetic record therearound, and an electric motor to rotate the drum, a control circuit for the motor, said control circuit comprising: a position switch actuable only when the drum is in a predetermined position; a motor control relay having a winding and a pair of self-locking contacts; a stop relay having a winding; a series circuit including a capacitor and said stop relay winding connected in series; and a resistor connected in parallel with series circuit; said stop relay having a pair of normally closed contacts serially connected with said motor control relay winding; said stop relay being actuable momentarily in response to actuation of said position switch by movement of the drum to said predetermined position.

19. In a seismic recorder including a rotatable drum to retain a magnetic record therearound, and an electric motor to rotate the drum, a control circuit for the motor, said control circuit comprising: a start position switch actuable only when the drum is in a corresponding start position; a load position switch connected in parallel with said start position switch and actuable only when the drum is in a corresponding load position; a motor control relay having a pair of self-locking contacts and a pair of normally open contacts to energize the motor; and a two-position selector switch connected to one side of each of said position switches to cause deenergization of said relay only upon actuation of said starting switch when in one of said two positions and to deenergize said relay only upon actuation of said load position switch when in the other of said two positions.

20. In a record positioning device wherein a rotary mechanism is utilized to support a recording medium, the rotary mechanism being driven through a control circuit, a selectively actuable switching arrangement for deactuating said control circuit at either of two selected stopping positions corresponding to the starting position for the rotary mechanism, or to its loading position, said switching arrangement comprising: a first stop switch adapted to assume an actuated position when said rotary mechanism has been driven to said starting position; a second stop switch adapted to be actuated in response to the movement of said mechanism to the load position; a selector switch having first and second positions representing starting and loading selections, respectively; circuit means coupling said first and second stop switches to said control circuit to provide a deactuating signal path for said control circuit whereby the actuation of either of said stop switches will cause the discontinuance of the driving of said rotary mechanism; said control circuit including a reproduced control circuit; said reproduced control circuit including a first circuit path through said selector switch whereby a reproduced operation is automatically terminated due to the actuation of said stop switches, and a second circuit path for direct actuation whereby said reproducing operation will continue regardless of the actuation of said stop switching.

References Cited in the file of this patent

UNITED STATES PATENTS

| | | |
|---|---|---|
| Re. 22,970 | Begun | Feb. 10, 1948 |
| Re. 23,112 | Squire | May 10, 1949 |
| 747,070 | Hood | Dec. 15, 1903 |
| 1,708,430 | Perdue | Apr. 9, 1929 |
| 1,844,648 | Farley | Feb. 9, 1932 |
| 2,200,351 | Whitehead | May 14, 1940 |
| 2,227,207 | Chenoweth | Mar. 24, 1942 |

UNITED STATES PATENT OFFICE
CERTIFICATE OF CORRECTION

Patent No. 2,846,661                                                            August 5, 1958

James M. Cunningham

It is hereby certified that error appears in the printed specification of the above numbered patent requiring correction and that the said Letters Patent should read as corrected below.

Column 6, line 62, strike out "means"; line 75, strike out "lead"; column 12, line 8, for "looks" read -- locks --; line 72, after "side" strike out the semicolon; column 13, line 27, after "side" strike out the semicolon; column 14, line 12, after "response" insert -- to --; column 16, line 36, for "and on electric" read -- and an electric --; column 17, lines 4 and 55, before "series", in each occurrence, insert -- said --.

Signed and sealed this 2nd day of June 1959.

(SEAL)
Attest:

KARL H. AXLINE                                             ROBERT C. WATSON
Attesting Officer                                         Commissioner of Patents